No. 658,518. Patented Sept. 25, 1900.
W. H. TAYLOR.
COMBINED DOOR CHECK AND CLOSER.
(Application filed Apr. 25, 1900.)
(No Model.) 5 Sheets—Sheet 1.
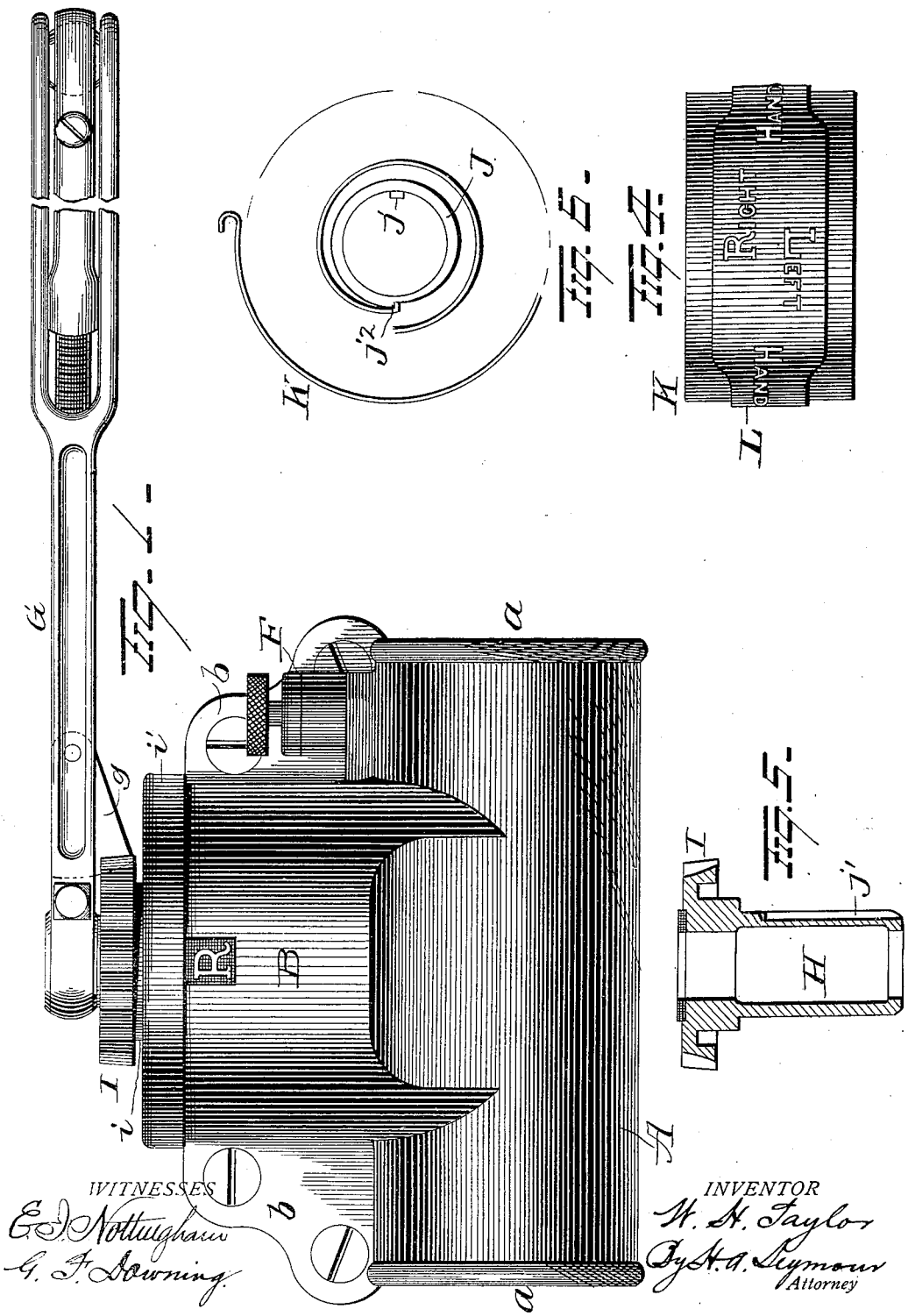

No. 658,518. Patented Sept. 25, 1900.
W. H. TAYLOR.
COMBINED DOOR CHECK AND CLOSER.
(Application filed Apr. 25, 1900.)
(No Model.) 5 Sheets—Sheet 2.
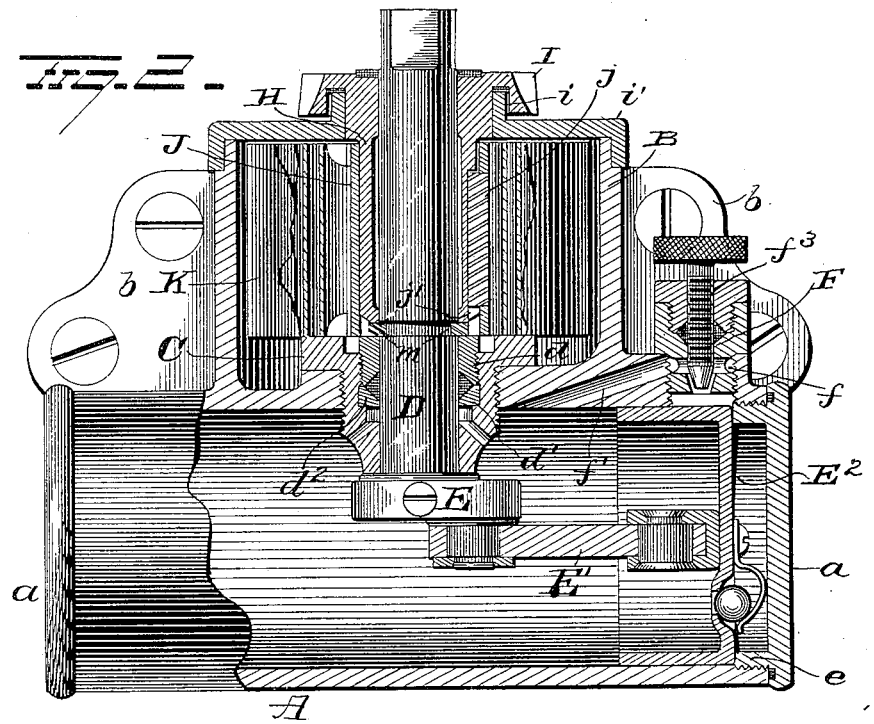
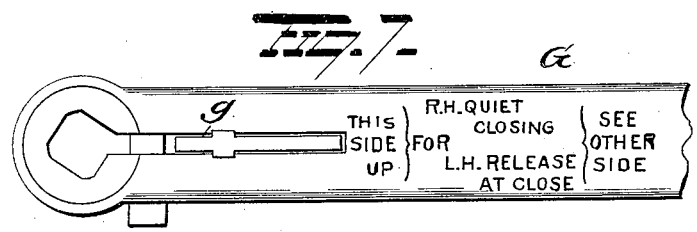
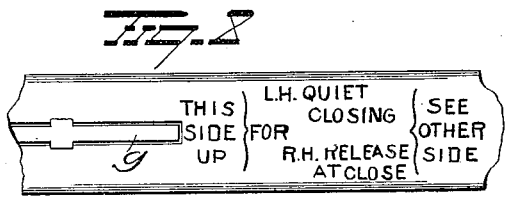
WITNESSES
E. F. Nottingham
G. F. Downing
INVENTOR
W. H. Taylor
By H. A. Seymour
Attorney
THE NORRIS PETERS CO., PHOTO-LITHO., WASHINGTON, D. C.

No. 658,518. Patented Sept. 25, 1900.
W. H. TAYLOR.
COMBINED DOOR CHECK AND CLOSER.
(Application filed Apr. 25, 1900.)
(No Model.) 5 Sheets—Sheet 3.
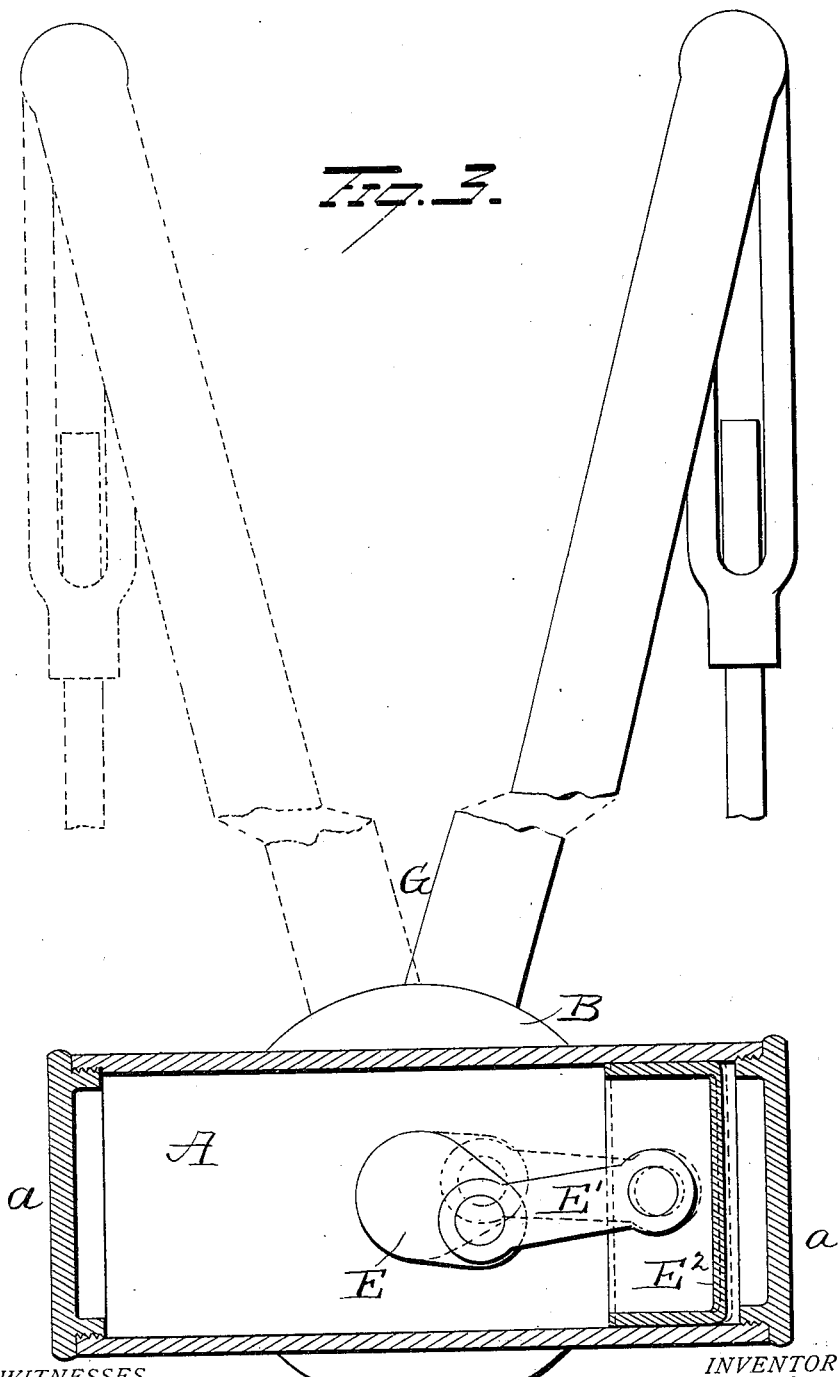

No. 658,518. Patented Sept. 25, 1900.
W. H. TAYLOR.
COMBINED DOOR CHECK AND CLOSER.
(Application filed Apr. 25, 1900.)
(No Model.) 5 Sheets—Sheet 4.
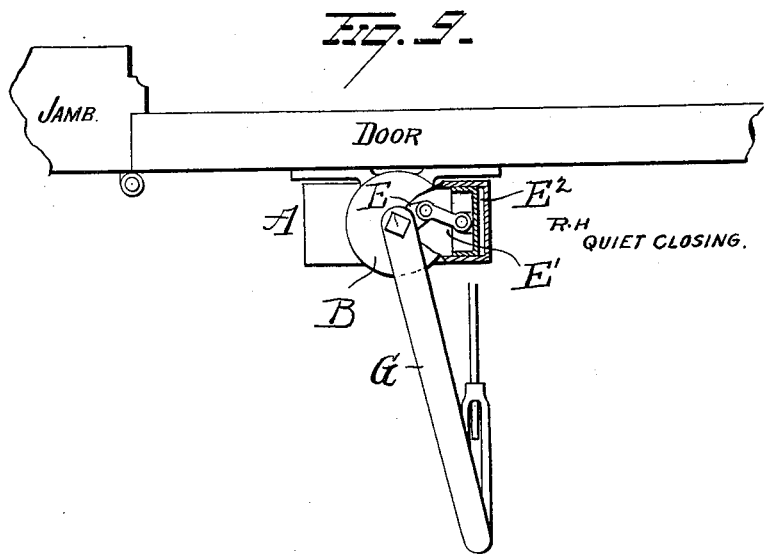
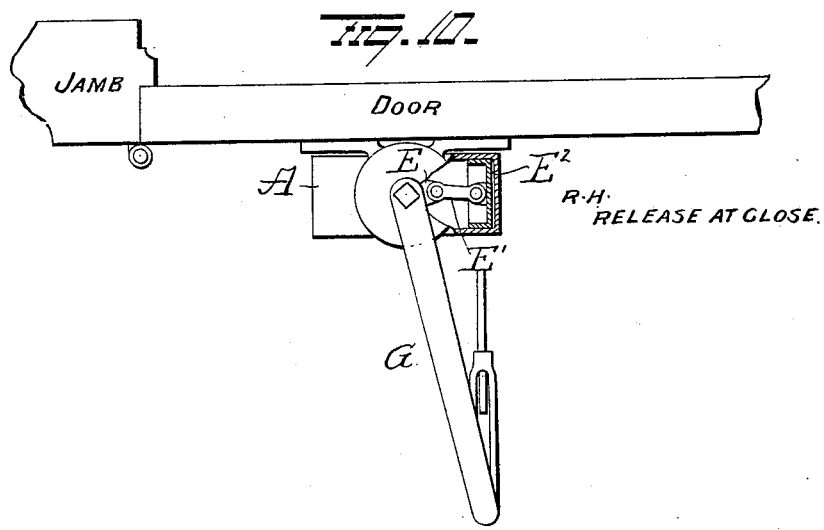
WITNESSES
E. J. Nottingham
G. F. Downing
INVENTOR
W. H. Taylor
By H. A. Seymour
Attorney
THE NORRIS PETERS CO., PHOTO-LITHO., WASHINGTON, D. C.

No. 658,518. Patented Sept. 25, 1900.
W. H. TAYLOR.
COMBINED DOOR CHECK AND CLOSER.
(Application filed Apr. 25, 1900.)
(No Model.) 5 Sheets—Sheet 5.
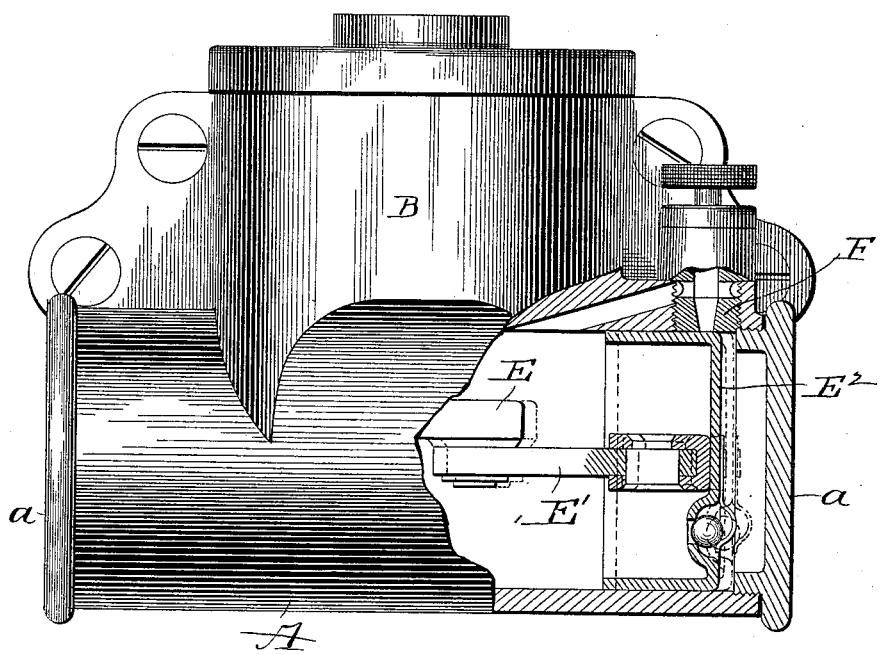
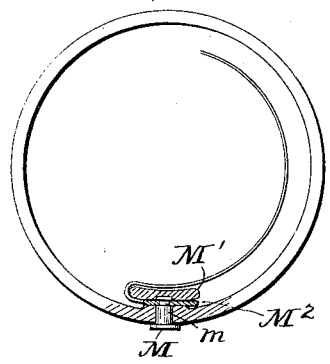
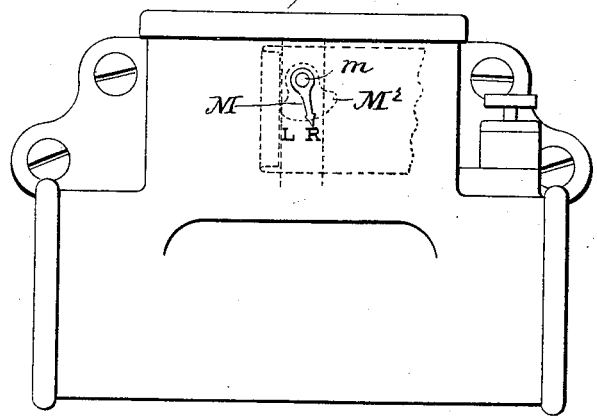
WITNESSES
E. J. Nottingham
G. F. Downing
INVENTOR
W. H. Taylor
By H. A. Seymour
Attorney
THE NORRIS PETERS CO., PHOTO-LITHO., WASHINGTON, D. C.

United States Patent Office.

WARREN H. TAYLOR, OF STAMFORD, CONNECTICUT, ASSIGNOR TO THE YALE & TOWNE MANUFACTURING COMPANY, OF SAME PLACE.

COMBINED DOOR CHECK AND CLOSER.

SPECIFICATION forming part of Letters Patent No. 658,518, dated September 25, 1900.

Application filed April 25, 1900. Serial No. 14,341. (No model.)

*To all whom it may concern:*

Be it known that I, WARREN H. TAYLOR, of Stamford, in the county of Fairfield and State of Connecticut, have invented certain new and useful Improvements in a Combined Door Check and Closer; and I do hereby declare the following to be a full, clear, and exact description of the invention, such as will enable others skilled in the art to which it appertains to make and use the same.

My invention relates to an improvement in a combined door check and closer; and it consists in the parts and combinations of parts, as will be more fully described, and pointed out in the claims.

In the accompanying drawings, Figure 1 is a view in elevation of my improved check. Fig. 2 is a view in longitudinal section of same. Fig. 3 is a longitudinal sectional view of the device from below. Fig. 4 is a view of the spring, showing its retaining-band. Fig. 5 is a view in section of the ratchet and its sleeve. Fig. 6 is a plan view of the spring and its arbor. Figs. 7 and 8 are views in opposite sides of the lever. Figs. 9 and 10 are diagrammatic views showing the lever in its two positions on the shaft. Fig. 11 is a view of a modification, and Figs. 12 and 13 are views of a modified construction for indicating the position of the spring.

A represents a horizontal cylindrical casing closed at its ends by screw-caps $a$ and provided on its top with a cylindrical chamber B and with the wings or lips $b$, having screw-holes therein for the attachment of the combined check and closer to a door. The chamber B has a female threaded opening centrally in its bottom, in which is screwed the gland C, the latter having an opening at its lower end adapted to closely embrace the shaft B and provided on its upper face with an opening sufficiently large to receive the packing-rings $d$ and $d'$ and the interposed packing $d^2$, the ring $d$ being screw-threaded externally and both rings being beveled on their inner faces, as shown, so as to compress the packing $d^2$ between them.

The crank E is secured on the lower end of the shaft D and is connected by pitman $E'$ with the piston $E^2$, the latter having one or more valved openings therein, through which the liquid within the chamber may freely pass when the piston $E^2$ is moving toward the shaft D and which closes when the piston is moving away from the shaft, as in the act of closing the door. The piston normally or when the door to which the check is attached is closed rests against the flange $e$ of the head $a$, and until this position of the piston is reached the liquid in front of the piston has a more or less restricted avenue of escape through the by-pass valve F. This valve F comprises a casing screwed into the top of cylinder A and is provided with an opening in its bottom communicating with cylinder A and with a lateral opening $f$, leading to a groove formed in the outer face of the valve-casing, the said groove being in a line with the port $f'$ in the upper wall of cylinder A, so that the liquid passing into the valve-casing escapes into port $f'$ and from thence into cylinder A in rear of the piston, the size of the by-pass being regulated by the screw-valve $f^3$, sealed and suitably packed in the valve-casing. With this construction it will be seen that when the piston is moved toward the shaft D the liquid passes freely to the front of the piston through the valved openings in the head; but as soon as the piston is forced in the opposite direction the valve in the piston closes, and the speed of the piston is regulated solely by the escape of the liquid through the by-pass. Hence by elevating valve $f^3$, so as to increase the size of the escape-opening, the more rapidly will the piston move, and by decreasing the size of the escape-opening the speed of the piston will be diminished. The shaft D passes upwardly through the bearing C, packing-rings $d$ and $d'$, and the cylinder B and is provided with an angular upper end on which the lever G is secured. This lever G is jointed in the usual manner, and the bracket or knuckle on the free end thereof is secured by screws to the door frame or jamb, the check or closer being secured to the door. By opening the door the shaft D will be rotated and the piston moved toward the shaft, and by closing the door the piston will be moved toward the end of its cylinder.

Located within the spring-chamber B and surrounding the shaft D is the ratchet-sleeve H. This sleeve is provided at its upper end with a ratchet-wheel I, grooved on its under face to receive the circular flange $i$ on the cap $i'$ of the spring-chamber, the teeth of said ratchet being engaged by the pivoted pawl of the lever G. This pawl $g$ can project from either face of the lever. Hence the single pivoted pawl operates to lock the lever and ratchet-wheel together when the lever G is in either of its two positions, to be hereinafter described.

Located within the spring-chamber B and surrounding the ratchet-sleeve H is the cam sleeve or arbor J. This sleeve or arbor is provided internally with a spline $j$, which rests within an external groove $j'$ in the sleeve H, and externally with a shoulder $j^2$, as shown in Fig. 6, against which the inner end of the spring K bears.

In the ordinary forms of door-checks the change to adopt it from a right to a left hand door, or vice versa, is a difficult one to accomplish for one not skilled in the art. In my device the parts are so constructed that if not properly set up no damage can possibly result, for the reason that no tension will be exerted on the spring. Hence there is no liability through abnormal pressure or tension to distort the spring or rupture the surrounding case. The spring K is coiled around the sleeve J, and the relative positions of the sleeve and spring are always the same, and when the spring is removed and turned upside down to convert the closer and check from, say, a right-hand check and closer to a left-hand check and closer the sleeve is also turned. The shape of this sleeve J is that of a cam with a shoulder $j^2$ at one side, which engages the bent inner end of the spring. When the ratchet-sleeve H is in position within the spring arbor or sleeve J, it is obvious that if the ratchet I is turned in one direction it will tend to wind up the spring, and if turned in the opposite direction it will simply revolve the sleeve J without exerting any force on the spring. Hence if the check and closer be assembled for a right-hand door and it should be applied to a left-hand door the failure of the spring to act would show at once that the parts were not properly adjusted. By now removing the ratchet-sleeve and cover of the spring-chamber the spring, which is held by a surrounding band L, and its arbor J may be lifted out, turned over, and replaced, the hook-shaped free outer end of the spring engaging a projection on the inner face of the casing. Thus it will be seen that the "hand" of the check may be changed by the simple expedient of lifting out the spring and its arbor or sleeve and turning them bodily over without any change or adjustment of any other parts and without removing the check and closer from the door. It is also evident that by no ignorance or carelessness can the spring be put into the check in such a manner that any force can be exerted to unwind it, and thus exert any undesigned strain on it. To render the proper adjustments perfectly clear to any ordinary mechanic and to show at a glance whether the spring is properly adjusted for the door to which it is to be applied, I have provided the spring-casing with an opening therein and the spring-sustaining band with the words "Right hand" and "Left hand," so that when the spring is placed within the spring-casing the letters "R" or "L" appear opposite the opening in the casing, thus indicating from the outside the hand for which the spring is set. I might make the opening large enough to show either or both the words "Right hand" or "Left hand," or I may use other terms for indicating the position of the spring, as my object is to show plainly from the outside the position of the spring, and when the spring is "out of check" it is a very simple matter for any one to change its adjustment.

Instead of having a hole in the casing through which a letter or symbol may be seen for indicating the position and adjustment of the spring I may employ the external indicator shown in Figs. 12 and 13. In this construction the letters "L" and "R" or other characters or symbols for indicating the two positions of the spring are located on the outer face of the spring-chamber, and the hand for which the spring is set is indicated by the pointer M, secured to the outer end of the stud $m$, mounted in the casing B.

In door-checks designed for use on right and left hand doors the spring-chamber is provided usually with an inwardly-projecting undercut rib M', one edge of which engages the outer end of the spring when the latter is set for right-hand doors, while the opposite edge is engaged by the spring when the latter is reversed for use on left-hand doors. Located within a slot behind this rib and secured on the stud $m$ is the cam M². This cam is wider than the base of rib M', and hence one edge of the cam always projects beyond the base, so as to be engaged by the end of the spring. In the construction shown the pointer M, pointing toward the letter "R," indicates that the spring is set for a right-hand door. If the spring should now be reversed, its outer end would engage the opposite end of cam M² and move same and the pointer M, carried thereby, toward the letter "L," thus indicating from the outside that the check as assembled is for a left-hand door.

The jointed lever-arm G is, as before explained, clamped in its place on end of shaft D by means of a screw, as shown. The pawl $g$, pivoted to the arm G, rests in a slot in said arm and, as before explained, is designed to project from either face of the arm, so that the pawl will engage with the ratchet I integral with the sleeve H, thus making a connection between the lever-arm and spring through the ratchet-sleeve and spring-arbor. The end of the shaft is preferably angular, and the slot in the lever-arm designed to receive this angular end is so positioned with relation to the arm that a line passing through the longitudinal center of the arm does not coincide either with a line passing diagonally through the shaft-head or with a line parallel with the sides of the latter. Hence when the position of this lever-arm is reversed—that is to say, when it is turned top side down—the relative positions between the shaft-head at one end and the piston-head or other checking-surface at the other will be changed. The reason for this is that it is desired to get an adjustment between this shaft-head at one end and the piston-head at the other end, so that the same parts may be adapted to close the door slowly and silently or may at the very point for closing the door give it a sudden short and powerful movement. For example, where a door-check is used in connection with an electric door-opener, which tends when released to spring the door slightly open, the door-check when it closes the door must have at the very end of its stroke a short and powerful movement to overcome this door-opening spring. The position of the lever-arm on the shaft D will determine how far the crank E will revolve, and Figs. 3 to 9 and 10 are for the purpose of representing the relative positions of the crank and piston in its two adjustments, which, as before stated, are dependent on the position of the lever-arm G to the crank, while Figs. 9 and 10 show, respectively, the relative positions of the lever-crank and piston for right-hand quiet closing and right-hand quick closing.

In Fig. 3 the full lines show the adjustment for slowly closing a right-hand door, while the dotted lines show the positions for quickly closing a left-hand door. In the adjustment for slow closing the center line of the crank stops before reaching its dead-center, as shown in full lines, while for quick closing it will approach nearer the dead-center, as shown in dotted lines. It is evident that the nearer a crank approaches its dead-center the greater circular motion it has with reference to the imparted motion of the piston—that is, supposing the crank to be on its center, it can be moved an appreciable distance either way without imparting any appreciable motion to the piston. Now the motion of the piston when the door is being closed means the forcing of a certain amount of liquid through the by-pass to the rear of the piston, and the less the liquid which must be forced through the less resistance there is to the spring. Accordingly when the crank is on its center there is no resistance to the action of the spring, and when it is slightly removed, say, ten-hundredths away there is very much less resistance than when it is twenty-hundredths away. Therefore when the lever-arm G is put on the shaft D in such a way that the center line of the crank only approaches to within, say, twenty-hundredths of the center of the piston there is never a time when an appreciable amount of liquid does not have to be forced through the by-pass, so that the door will close always under the control of the liquid; but when the center line of the crank approaches to, say, within ten-hundredths of said center line the motion of the piston is practically nothing at the end, so that the force of the spring is practically unopposed and the door will be closed with a short sudden impulse.

In order to show at a glance how the lever-arm G should be applied for quick or slow closing on either right or left hand checks, I have provided the two faces of the lever with the necessary directions, as shown in Figs. 7 and 8. Thus the side which should be uppermost for right-hand slow closing should also be up for left-hand quick closing, while the side which is uppermost for left-hand slow closing should be up for right-hand quick closing.

The real efficiency of the device consists in being able to adjust the movement of the piston-head or other checking-surface so that the liquid which is being moved by the movement of the checking-surface may be more or less forced through the by-pass or other outlet for the liquid at the end of the stroke.

In the construction shown in Fig. 11 I disclose a construction wherein a quick closing may occur on a shorter stroke of the piston, while a slow closing may occur on a longer stroke. This is accomplished by making the by-pass or outlet coincide with the termination of the short stroke.

In the construction shown in the sectional view Fig. 2 the by-pass is not wholly closed to the liquid in front of the piston until the latter makes contact with the inwardly-projecting flange of the cap $a$.

In the construction shown in Fig. 11 the lower end of valve-casing F rests flush with the inner face of the cylinder A. Hence as soon as the piston passes the opening in the valve-casing F and before it reaches the flange of cap $a$ the by-pass will be cut off. If the adjustment of the apparatus and door were such that the door would be closed before or just as the piston covers the by-pass, it is evident that the action will be quick closing throughout the stroke. If, however, the adjustment of the parts is such that the piston-head or other checking-surface has to travel farther or past the by-pass opening in order to completely close the door, it will be opposed by the liquid in the end of the cylinder, which can only escape by leakage past the piston-head. Hence the final closing motion will be easy and slow.

The value and efficiency of the adjustment between the lever-arm and the check-surface are not dependent on the use of any particular form of checking-surface. Hence it may be used either with a horizontal or vertical reciprocating piston or upon what is known as a "wing-check"—that is, where the checking-surface revolves and does not reciprocate like a piston.

Another feature of my device which I consider of importance is the by-pass valve. Heretofore the by-passage has been formed in an integral part of the cylinder. Hence it is not possible to test the valve until the entire apparatus has been assembled. With my device the regulating-valve is independent of the main cylinder, and hence can be tested before it is secured in its position.

The shaft D is sustained in its proper position vertically within the casing by the two-part ring $m^3$, which latter rests on the packing-nut $d$, with its inner edge within a circumferential groove in the shaft D.

It is evident that many slight changes might be made in the relative arrangement of parts herein shown and described without departing from the spirit and scope of my invention. Hence I would have it understood that I do not wish to confine myself to the exact construction herein shown and described; but, Having fully described my invention, what I claim as new, and desire to secure by Letters Patent, is—

1. In a combined door-check and closer, the combination with a casing, a shaft, and a piston and a lever-arm connected to said shaft, of a sleeve mounted on the shaft and free to turn thereon, a reversible cam-shaped arbor removably secured to the sleeve and provided with a longitudinal shoulder or abutment, a spring the outer end of which is detachably secured to the casing, while the inner end of the spring is bent inwardly at approximately right angles to its body so as to engage the longitudinal shoulder or abutment on the cam-shaped arbor and means connecting the sleeve and lever-arm, substantially as and for the purpose set forth.

2. In a combined door check and closer, the combination with a casing, shaft, and spring, of a checking-surface connected to the shaft, a reversible lever-arm secured to the shaft and a pivoted pawl adapted to project on either side of the lever-arm, substantially as and for the purpose set forth.

3. In a combined door check and closer, the combination with a casing, shaft and spring, of a checking-surface connected to the shaft and a reversible lever-arm secured to the shaft, the angular opening in the lever-arm being located in a position slightly to one side of the center of the head of the lever so that when the lever-arm is reversed on the shaft the relative positions of the lever-arm and piston-head or other checking-surface are changed thus changing the length of the throw of the crank.

4. In a combined door check and closer, the combination with a casing, a shaft, and spring, of a checking-surface connected to the shaft and a reversible lever-arm secured to the shaft, the connection between the lever-arm and the shaft being so related to the center line through the head of said shaft and said lever that when the lever-arm is reversed on the shaft, the relative positions of the lever-arm and checking-surface are changed thus changing the length of the throw of the crank.

5. In a combined door check and closer, the combination with a casing containing a spring and a piston, the spring-chamber having an aperture therein, of a reversible spring carrying a series of characters one of which shows through the aperture in the casing and indicates from the outside the "hand" for which the check is adjusted.

6. In a combined door check and closer the combination with a liquid-chamber, a piston therein, a spring-chamber, a spring therein and a shaft engaging the spring and actuating the piston, of a removable by-pass valve-casing secured to the liquid-chamber, and a screw-valve in said valve-casing, substantially as set forth.

7. In a door-closer a reversible lever-arm provided with a double-acting automatic latch so that in whatever position said lever-arm is placed upon the shaft-head, the said latch will automatically connect it with the spring-actuating mechanism.

8. In a combined door closer and check, the combination of an adjustable lever-arm, a spring-actuated shaft and a piston or other checking-surface actuated by said shaft through suitable connecting mechanism, and an outlet or by-pass, the whole being so arranged that a reversal or turning upside down of the lever-arm changes the length of travel of the piston, substantially as described.

9. A spring adapted for door-closers, provided with indicating words or marks placed in fixed relation to the other parts of the spring so that said spring indicates on inspection the position in which it must be placed in the door-closer to cause said closer to operate a right or left hand door.

10. In a combined door check and closer the combination with a casing containing a spring and a checking-surface, of indicating devices for positively indicating from the outside the "hand" for which the spring is set.

In testimony whereof I have signed this specification in the presence of two subscribing witnesses.

WARREN H. TAYLOR.

Witnesses:
SCHUYLER MERRITT,
W. S. ABEL.